United States Patent
Herman et al.

(10) Patent No.: US 11,021,159 B2
(45) Date of Patent: Jun. 1, 2021

(54) ROAD SURFACE CONDITION DETECTION

(71) Applicant: Ford Global Technologies, LLC, Dearborn, MI (US)

(72) Inventors: David Michael Herman, Oak Park, MI (US); Ashwin Arunmozhi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 16/508,153

(22) Filed: Jul. 10, 2019

(65) Prior Publication Data

US 2021/0009137 A1 Jan. 14, 2021

(51) Int. Cl.
*B60W 40/06* (2012.01)
*G01S 7/48* (2006.01)

(52) U.S. Cl.
CPC ........... *B60W 40/06* (2013.01); *G01S 7/4802* (2013.01); *B60W 2420/52* (2013.01)

(58) Field of Classification Search
CPC combination set(s) only.
See application file for complete search history.

(56) References Cited

U.S. PATENT DOCUMENTS

| | | | |
|---|---|---|---|
| 8,477,192 B2 | 7/2013 | Capello et al. | |
| 9,453,941 B2 | 9/2016 | Stainvas Olshansky et al. | |
| 2011/0060478 A1* | 3/2011 | Nickolaou | G01S 17/86 |
| | | | 701/1 |
| 2014/0307247 A1 | 10/2014 | Zhu et al. | |
| 2016/0178802 A1* | 6/2016 | Stainvas Olshansky | G01N 21/4738 |
| | | | 356/341 |
| 2017/0106855 A1 | 4/2017 | Lavoie et al. | |
| 2019/0317217 A1* | 10/2019 | Day | G01S 17/04 |
| 2019/0369212 A1* | 12/2019 | Dylewski | G01S 17/93 |

FOREIGN PATENT DOCUMENTS

| | | |
|---|---|---|
| CN | 103134777 A | 6/2013 |
| DE | 102016009928 A1 | 2/2017 |

OTHER PUBLICATIONS

Aki et al., "Road Surface Recognition Using Laser Radar for Automatic Platooning", IEEE Transactions on Intelligent Transportation Systems, vol. 17, No. 10, Oct. 2016.
Casselgren et al., "Angular spectral response from covered asphalt", Applied Optics, vol. 46, No. 20, Jul. 10, 2007.
Chen et al., "Lidar-histogram for fast road and obstacle detection", 2017 IEEE International Conference on Robotics and Automation (ICRA), May 29-Jun. 2017.

(Continued)

*Primary Examiner* — Zhiyu Lu
(74) *Attorney, Agent, or Firm* — Frank A. MacKenzie; Bejin Bieneman PLC

(57) ABSTRACT

A system includes a computer comprising a processor and a memory. The memory stores instructions such that the processor is programmed to determine, based on vehicle lidar sensor data, a reflectivity of an area of a road surface, and to determine whether the area is wet based on the determined reflectivity of the area, a dry-condition reflectivity threshold for the area, and an angle of viewing the area from the lidar sensor.

17 Claims, 9 Drawing Sheets

(56) References Cited

OTHER PUBLICATIONS

Frederiksen et al., "Reflection classification of dry and wet road surfaces", Lighting Research & Technology, vol. 8, Issue 4, Dec. 1, 1976, https://journals.sagepub.com/doi/10.1177/14771535760080040601.

Kashani et al., "A Review of LIDAR Radiometric Processing: From Ad Hoc Intensity Correction to Rigorous Radiometric Calibration", Sensors 2015, 15, 28099-28128, www.dpi.com/journal/sensors.

Matiukas et al., "Point Cloud Merging from Complete 3D Surface Reconstruction", Electronics and Electrical Engineering, 2011, No. 7(113), http://dx.doi.org/10.5755/01.eee.113.7.616.

Nguyen et al., "3D tracking of water hazards with polarized stereo cameras", 2017arXiv170104175N, http://adsabs.harvard.edu/abs/2017arXiv170104175N.

Luo et al., "Performance analysis of a car-to-car visible light communication system", Applied Optics, vol. 54, No. 7, Mar. 1, 2015.

Press Release, "Velodyne's Calibrated Reflectivity Lands Major Order", Mar. 20, 2014, https://blog.lidarnews.com/velodynes-calibrated-reflectivity-lands-major-order/.

Shao et al., "Research on water hazard detection based on line structured light sensor for long-distance all day", 2015 IEEE International Conference on Mechatronics and Automation (ICMA), Aug. 2-5, 2015, https://ieeexplore.ieee.org/document/7237756.

Wojtanowski et al., "Comparison of 905 nm and 1550 nm semiconductor laser rangefinders' performance deterioration due to adverse environmental conditions", Opto-Electronics Review 22(3), 183-190, https://www.researchgate.net/publication/263472962.

Ylinen et al., "Investigation of Pavement Light Reflection Characteristics", Road Materials and Pavement Design, vol. 12, 2011, Issue 3, https://www.tandfonline.com/doi/abs/10.1080/14680629.2011.9695262.

Zhao et al., "A New K Nearest Neighbours Algorithm Using Cell Grids for 3D Scattered Point Cloud", Elektronika Ir Elektrotechnika, vol. 20, No. 1, 2014, http://dx.doi.org/10.5755/j01.eee.20.1.3926.

\* cited by examiner

ROAD SURFACE CONDITION DETECTION

BACKGROUND

Vehicles can be equipped with various types of object detection sensors in order to detect objects in an area surrounding the vehicle. Vehicle computers can control various vehicle operations based on data received from the sensors. Weather conditions such as rain may affect sensor data and/or vehicle driving dynamics, e.g. stopping distance.

DETAILED DESCRIPTION

Introduction

Figure 1:
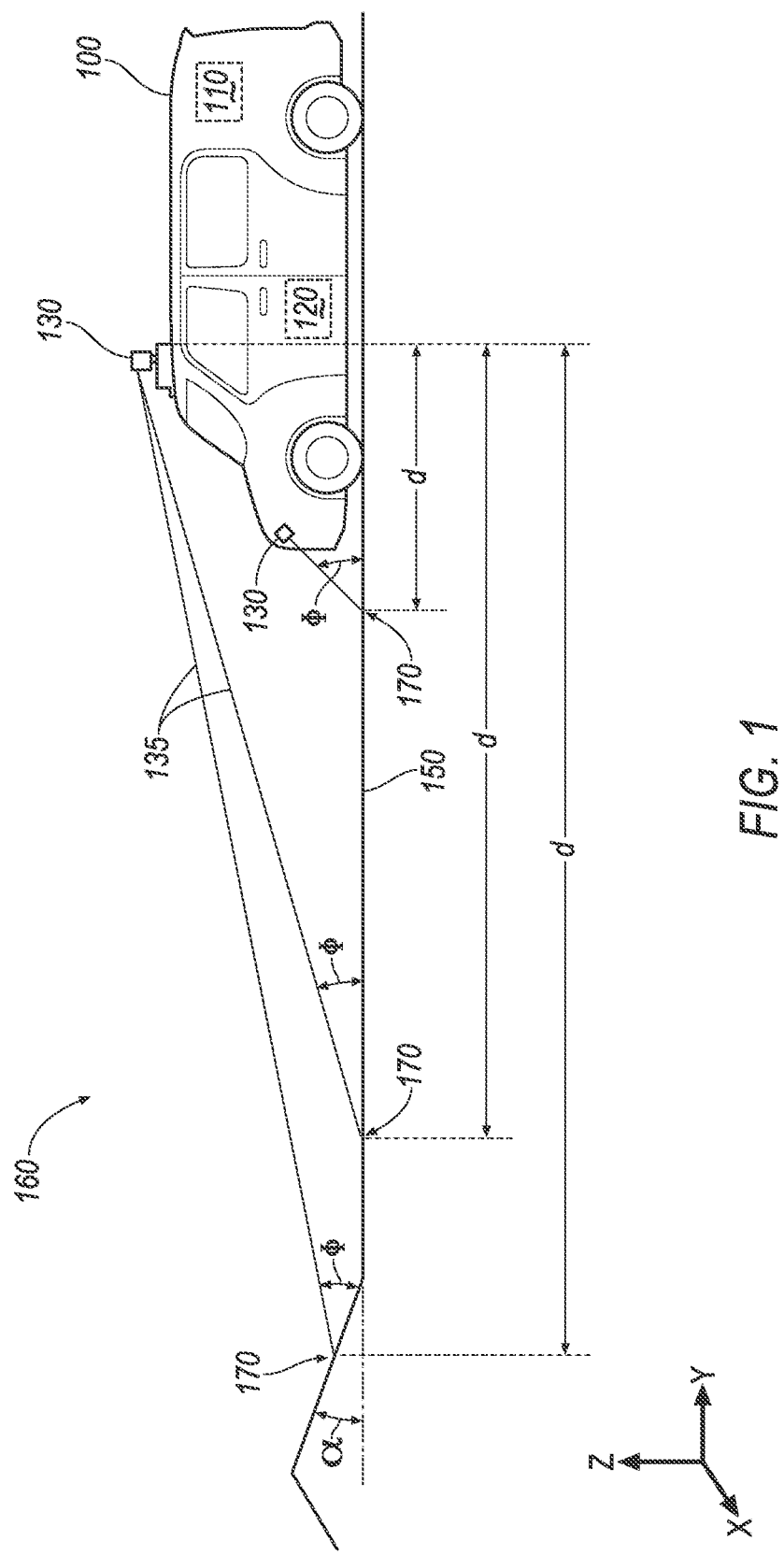
FIG. 1 shows an exemplary vehicle with one or more lidar sensors

A system comprises a computer including a processor and a memory. The memory stores instructions such that the processor is programmed to determine, based on vehicle lidar sensor data, a reflectivity of an area of a road surface, and to determine whether the area is wet based on the determined reflectivity of the area, a dry-condition reflectivity threshold for the area, and an angle of viewing the area from the lidar sensor.

The instructions may include further instructions to identify the area based on data received from at least one of a vehicle camera and the vehicle lidar sensor only upon determining that the road surface is visible to the lidar sensor.

The instructions may include further instructions to determine that the road surface is visible at the area based on lidar map data and a location of a detected object on the road surface.

The instructions may include further instructions to determine the reflectivity based on lidar map data, to determine the dry-condition reflectivity threshold based at least in part on the viewing angle of the area, and to determine that the area is wet based on the dry-condition reflectivity threshold.

The instructions may include further instructions to determine a second reflectivity of the area from a second viewing angle, and to determine that the area is wet further based on the second reflectivity and the second viewing angle.

The instructions may include further instructions to determine a viewing angle threshold for the area, and to determine that the area is wet upon determining that the viewing angle threshold is less than the second viewing angle and greater than the viewing angle, the reflectivity is less than the dry-condition reflectivity threshold adjusted for the viewing angle, and the second reflectivity is greater than the dry-condition reflectivity threshold adjusted for the second viewing angle.

The instructions may include further instructions to determine the reflectivity with the viewing angle based on data received from the lidar sensor and the second reflectivity with the second viewing angle based on data received from a second lidar sensor.

The instructions include further instructions to classify the area with a first material based on at least one of map data and camera data, to classify the area with a second material based at least in part on the determined reflectivity, and to determine that the area is wet upon determining that the first and second materials.

The instructions may include further instructions to determine an inconclusive wetness detection upon determining based on vehicle camera data that lidar map data lacks data including a change made to the road surface, wherein the change is at least one of resurfacing the road surface and painting a new road marking.

Further disclosed herein is a system, comprising means for determining, based on lidar sensor data, a reflectivity of an area of a road surface, and means for determining whether the identified area is wet based on the determined reflectivity of the area, a dry-condition reflectivity threshold for the area, and an angle of viewing the area from the lidar sensor.

Further disclosed herein is a method, comprising determining, based on lidar sensor data, a reflectivity of an area of a road surface, and determining whether the identified area is wet based on the determined reflectivity of the area, a dry-condition reflectivity threshold for the area, and an angle of viewing the area from the lidar sensor.

System Elements

FIG. 1 illustrates an example vehicle 100 including a computer 110, actuator(s) 120, sensor(s) 130, and other components discussed herein below. The vehicle 100 may be powered in variety of known ways, e.g., including with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering; in a non-autonomous mode, a human operator controls vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., sensor(s) 130, actuator(s) 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The vehicle 100 actuators 120 may be implemented via circuits, chips, or other electronic components that can actuate various vehicle subsystems in accordance with appropriate control signals as is known. The actuators 120 may be used to control braking, acceleration, and steering of the first vehicle 100. As an example, the vehicle 100 computer 110 may output control instructions to control the actuators 120.

A computer, e.g., the computer 110, a remote computer, a computer of a mapping vehicle, etc., may be programmed to generate a three-dimensional (3D) map of an area 160. An area 160 may include a portion of the ground surface (i.e., earth surface), e.g., a neighborhood, a city, etc.

A 3D map of an area 160, in the context of present disclosure, is a digital map including 3D location coordinates of points on surfaces, e.g., a road surface 150, traffic signs, buildings, vegetation, etc., within the mapped area 160. The map data may further include a corresponding reflectivity R of surfaces 150, as discussed below. For example, FIG. 1 shows points 170 on various locations on the example road surface 150. In the present context, a point 170 may be any point on a surface 150 within the area 160 such as the road surface 150. The 3D location coordinates may be specified in a 3D Cartesian coordinate system with an origin point. For example, location coordinates of a point 170 on the road surface 150 may be specified by X, Y, and Z coordinates. X and Y coordinates, i.e., horizontal coordinates, may be global positioning system (GPS) coordinates (i.e., lateral and longitudinal coordinates) or the like, whereas a Z coordinate may specify a vertical component to a location, i.e., a height (or elevation) of a point 170 from, e.g., a sea level. A 3D map may be generated based on data received from a lidar sensor 130 which sweeps the area 160 with light beams and receives reflections of the broadcasted light beams from outer surfaces of the objects. In the present context, the area 160 is a 3D volume above ground with a bottom touching the ground surface and a top above the ground surface, e.g., at 50 meters from the ground surface. Thus, such a 3D map may include location coordinates of the points 170 on outer surfaces of objects which cause a reflection of the emitted light beams. Typically, such 3D maps are referred to as a "point cloud." Thus, point cloud data includes 3D location coordinates of points 170 on surfaces of objects such as the road surface and/or outer surfaces of objects within the area 160 that is mapped. In other words, the set of point cloud data includes 3D location coordinates of a plurality of points 170 within the physical area 160 that is covered by the set point cloud data. Using interpolation techniques, a 3D mesh of surface(s) 150 may be created based on point cloud data. Moreover, map data may include material properties classifications, e.g., vegetation, asphalt, concrete, metal plate, painted road surface, concrete embarkment, retroreflective surfaces, etc. Reflectivity of surfaces 150 may be at least in part determined based on material data included in map data.

The vehicle 100 may include one or more lidar (light detection and ranging) sensor(s) 130, e.g., a solid-state flash lidar sensor 130, providing data encompassing at least some of an exterior of the vehicle 100, e.g., the area 160 as shown in FIG. 1. In such an example, the lidar sensor 130 emits pulses of light into a field of illumination of the sensor 130 and detects surfaces such as the road surface 150 based on received reflections of light in a field of view of the lidar sensor 130. According to at least the illustrated example, the lidar sensor 130 includes one or more transmitters (or emitters) and one or more receivers. Alternatively, a sensor 130 may include a transceiver instead of separate transmitter and receiver. The light emitted by the light emitter may be, for example, infrared light, laser, and/or light with any other suitable wavelength.

The lidar sensor 130 may include a computer that is programmed to actuate the transmitter to emit light, i.e., light beam(s) 135, and detect surface points 170 based on received reflections of the emitted light. The lidar data may be received by the vehicle 100 computer 110 from lidar sensors 130 in a known manner, e.g., via a vehicle 100 network. The lidar data may include coordinates, e.g., in a 3-dimensional (3D) or Cartesian coordinate system. Lidar data may further include other data pertaining to other objects such as size, relative speed to the vehicle 100, polarization, etc.

The lidar sensor 130 computer and/or the computer 110 may be programmed to determine a sensed intensity $i_s(x, y, z)$ of reflected light beam 135 from a point 170 at location coordinates (x, y, z). An intensity $i_s$ value may be with a range of 0 (zero) to 100, where 0 (zero) is no reflection and 100 is full intensity. In another example, an intensity $i_s$ may be specified in luminous flux per unit area or lux (lx). The sensed intensity $i_s(x, y, z)$ of reflected light beam 135 is based at least in part of a reflectivity R of the surface 150 at the point 170 with coordinates (x, y, z).

Reflectivity (or reflectance) R of a surface 150 is a measure of its effectiveness in reflecting radiant energy. Reflectivity R of a surface is measured as a fraction of incident electromagnetic power that is reflected at the respective surface 150, e.g., specified in a percentage, a number between 0 (zero) and 1. Thus, more reflective, brighter surfaces may be associated with intensity values closer to 100, while less reflective, darker surfaces may be associated with intensity values closer to 0 (zero). As discussed below, e.g., with reference to FIG. 8, a reflectivity R of a surface 150 may be at least partially based on a material from which the surface 150 is formed. Further, a reflectivity R of a surface 150 changes based on an amount of moisture, liquid, etc., that covers the respective surface 150. As discussed below, with reference to FIGS. 2A-2B, a light beam 135 hitting a surface 150 may have a diffuse and/or specular reflection. The sensed intensity $i_s(x, y, z)$ of the reflected light beam 135 typically corresponds to a portion of diffused light that is received at the sensor 130 receiver. In one example, with a viewing angle Φ around 90°, e.g., between 80° and 110°, the sensed intensity $i_s(x, y, z)$ may include both a portion of the diffused light and the specular reflections of the light beam 135.

With reference to Equation (1), a sensed intensity $i_s(x, y, z)$ of a reflected light beam 135 from a point 170 at location coordinates (x, y, z) is at least partially based on: (i) a reflectance R(x, y, z) of the surface 150 at the point 170, (ii)

a viewing angle Φ of the point 170 on the surface 150, (iii) an intensity $i_e$ of the light beam 135 hitting the point 170 at the location (x, y, z), and a distance d from the vehicle 100 sensor 130 to the location (x, y, z). Operation f is a function that determines the sensed intensity based on inputs reflectivity R, viewing angle Φ, intensity $i_e$, and distance d. Operation f may be derived based on empirical methods, e.g., measuring the intensity $i_s$(x, y, z) for a plurality of various input values viewing angle Φ, distance d, etc., and determining the operation f using numerical techniques based on the results of empirical methods. Additionally or alternatively, Equation (6) may be determined based on known techniques from optics physics. In one example, Equation (1) may be derived based on empirical methods. The sensed intensity $i_s$(x, y, z) may be measured based on a plurality of different test scenarios, i.e., combinations of intensity $i_e$, distance d, reflectivity R. Then, an example Equation (1) may be created using numerical methods using the measurements of the test scenarios.

$$i_s(x,y,z)=f(R(x,y,z),\Phi(x,y,z),i_e(x,y,z),d(x,y,z)) \quad (1)$$

The viewing angle Φ, is an angle between the transmitted light beam 135 and the surface 150 at the location (x, y, z) where the light beam 135 hits the surface 150. FIG. 1 shows multiple points 170 with respective corresponding viewing angles Φ and distances d. The surface 150 can have a slope angle α (or, if α=0, is flat). The slope angle α is an angle between the surface 150 and a horizontal plane surface (i.e., a plane surface defined as 0 degrees, i.e., parallel to the horizon). Thus, the viewing angle Φ may be at least in part based on the slope angle α at the location coordinates (x, y, z). Note that for simplicity the angle Φ is shown as one dimensional, however, a point 170 is anywhere on the surface 150. In other words, the angle Φ is between a line extending from the sensor 130 to the point 170 and the surface 150.

The computer 110 may be programmed to determine the viewing angle Φ of the point 170 based on received map data including a slope angle α at the coordinates (x, y, z) and a distance d from the vehicle 100 sensor 130 to the location (x, y, z). Additionally or alternatively, the computer 110 may be programmed to determine the viewing angle Φ based on scanning the area 160 and identifying the surface 150 and determining the slope angle α and the viewing angle Φ based on the detected surface 150.

The computer 110 may be programmed to determine the intensity $i_e$ of the light beam 135 hitting the point 170 at the location (x, y, z) based on (i) technical characteristics of the sensor 130 transmitter, e.g., an output radiant energy power of the transmitter, (ii) an instruction of the computer 110 to the transmitter, e.g., an actuation command defining an amount of power to be radiated, and/or (iii) a distance d from the sensor 130 to the point 170 coordinates (x, y, z). Additionally, as shown in Equation (1), a sensed intensity $i_s$ may be based on the distance d from the sensor 130 to the point 170, because the reflected beam may attenuate (weaken) over a longer distance d until arrived at the sensor 130 receiver due to beam divergence and atmospheric absorption.

As discussed above, the 3D map data may include coordinates (x, y, z) of points 170. The 3D maps of the area 160 may further include map-based reflectivity $R_m$ of a point 170 on a surface 150, e.g., a reflectivity $R_m$ (x, y, z) specifying a reflectivity $R_m$ of a surface 150 at location coordinates (x, y, z) of a point 170. Herein, a subscript m at a reflectivity $R_m$ refers to a reflectivity determined based on map data or included in the map data. Highly reflective surfaces, such as lane markers, may be associated with a reflectivity R value which is greater than less reflective surfaces, such as blacktop, cement, or other roadway surfaces. Similarly, darker colors (black, navy blue, brown, dark gray, very dark gray, etc.) which absorb more light may be associated with a lower intensity value than lighter colored objects which may reflect more light (white, cream, silver, etc.). Thus, the computer 110 may be programmed to determine the reflectivity $R_m$ by identifying a surface 150 at a point 170 and consulting a look-up table or the like stored in the computer 110 memory (or received via the network 135) specifying a reflectivity of the surface 170 and/or a material indicated for the surface 170 accounting for specular, diffuse, and/or retroreflection reflections. That is, the 3D map data may include material information for each point 170 and/or object, e.g., pole, road surface 150, traffic sign, etc. (See FIG. 8 and below discussion thereof.)

As discussed above, a reflectivity R of a surface 150 may change based on an amount of moisture or liquid on the surface 150. For example, a reflectivity R(x, y, z) of the road surface 150 at the location coordinates (x, y, z) typically changes as the road surface 150 changes from dry-condition to wet or moist. Typically, lidar map data are generated based on collected lidar data under good weather conditions, i.e., absent an inclement weather condition such as rain, snow, etc. Thus, the lidar map data typically includes reflectivities R of surfaces 150 in the area 160 under dry-conditions, i.e., surfaces 150 that were dry at a time of capturing map data. Additionally or alternatively, the computer 110 may be programmed to determine the reflectivity R of the surface 150 based on the point cloud data, e.g., an intensity of the reflections stored from a respective surface 150 point 170 in the point cloud.

Figure 2A:
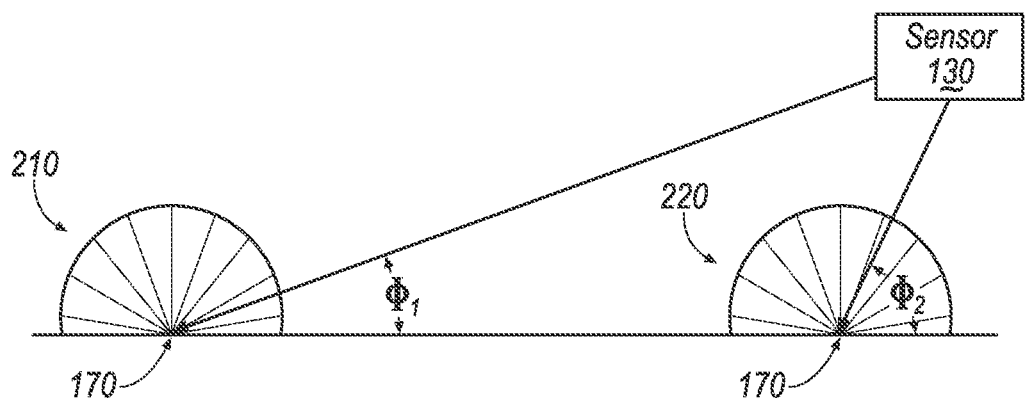
FIG. 2A shows light reflection patterns of light hitting a dry surface from different angles.

FIG. 2A shows light reflection patterns 200 of a light beam 135 hitting a dry surface 150 from different viewing angles $\Phi_1$, $\Phi_2$. For example, a first light beam 135 may hit the surface 150 with an angle $\Phi_1$ at a first point 170 that is farther from the sensor 130 compared to a second point 170 that is hit by a second beam 135 at a second angle $\Phi_2$. A light reflection pattern is a plurality of reflections from a point 170 upon illuminating the point 170 with a light beam 135.

A light beam 135 hitting a surface 150 may result in a diffuse reflection and/or a specular reflection. Diffuse reflection is reflection of light or other waves or particles from a surface 150 such that a beam 135 incident on the surface 150 is scattered at many angles rather than at just one angle as in the case of specular reflection. Many common materials, e.g., concrete, asphalt, etc., exhibit a mixture of specular and diffuse reflections. FIG. 2A shows an example reflection patterns 210, 220 on a dry road surface 150 which includes substantially diffuse reflections. Thus, the reflection patterns 210, 220 may be symmetrical, i.e., light diffused in many directions. As FIG. 2A shows, the light beam 135 hitting the dry surface 150 with the viewing angles $\Phi_1$, and the light beam 135 hitting the dry surface 150 with the viewing angle $\Phi_2$ may similarly result in substantially diffusing patterns 210, 220.

Figure 2B:
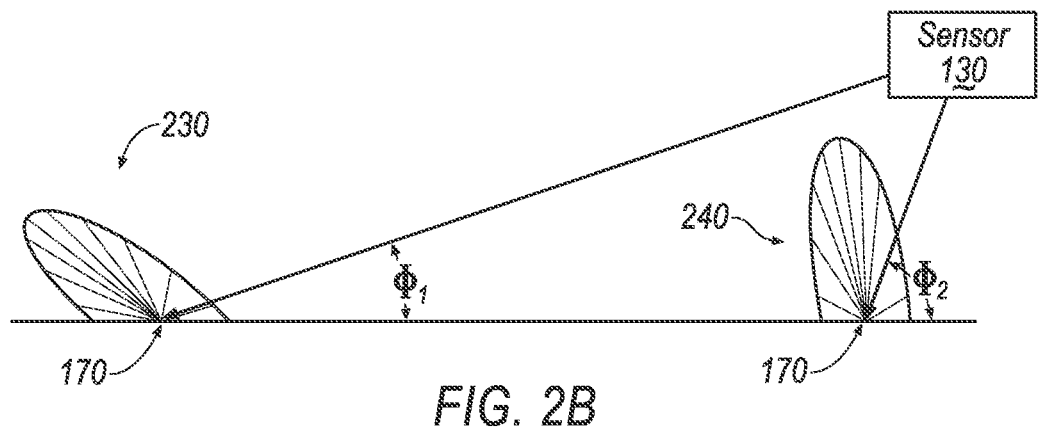
FIG. 2B shows light reflection patterns of light hitting a wet surface from different angles.

FIG. 2B shows light reflection patterns 230, 240 of light beam 135 hitting a wet surface 150 from different viewing angles $\Phi_1$, $\Phi_2$. In contrast to FIG. 2A, the reflections patterns 220, 230 in FIG. 2B illustrate a substantially specular reflection. Specular reflection is a type of light reflection often described as a mirror-like reflection of light from the surface, in which, the incident light, e.g., the light beam 135, is reflected into a single outgoing direction. A direction of a specular reflection is symmetric to the incident light beam 135 with respect to a vertical line at the point 170, e.g., a specular reflection of a light beam 135 with an angle 80° has an angle 110°. Changes of reflection pattern 210, 220, 230, 240 based on moisture level or wetness of the surface 150 are discussed with reference to FIGS. 3-6 below.

FIGS. 3-6 show respective graphs 300, 400, 500, 600 of light reflection on, respectively, dry, slightly moist, moist, and wet surfaces 150. The terms slightly moist, moist, and wet herein specify a moisture level on a surface 150 and may be qualitative terms or alternatively, may be defined based on a quantity of water on the surface 150, e.g., based on a thickness of a water layer on the surface 150. In one example, a surface 150 is "slightly moist" when a water layer thickness is less than 100 micron; a surface 150 is "moist" when a water layer thickness is between 100 and 500 micron; and a surface 150 is "wet" when a water layer thickness is greater than 500 microns. Alternatively, moisture or wetness may be caused by other liquids alone or in combination with one another and/or water, e.g., oil, etc., and/or vapors.

Each of the graphs 300, 400, 500, 600 show: (i) a ground plane that represents a side view of a surface 150 (e.g., as seen in FIGS. 1 and 2A-2B), (ii) a lidar beam that hits the ground plane, (iii) a specular bounce, i.e., a reflection at a same angle as the light beam that hit the ground plane, (iv) a diffuse reflection curve which is a result of a plurality of diffuse reflections from the ground plane, (v) a specular reflection curve which is a result of one or more specular reflections, and (vi) a sum (e.g., resultant vector sum) of specular and diffuse reflections. An empirical technique may be used to make a reflection model diffusive, ambient (if needed based for 3D map data for external light sources or a light sensor), and/or specular reflections.

Figure 3:
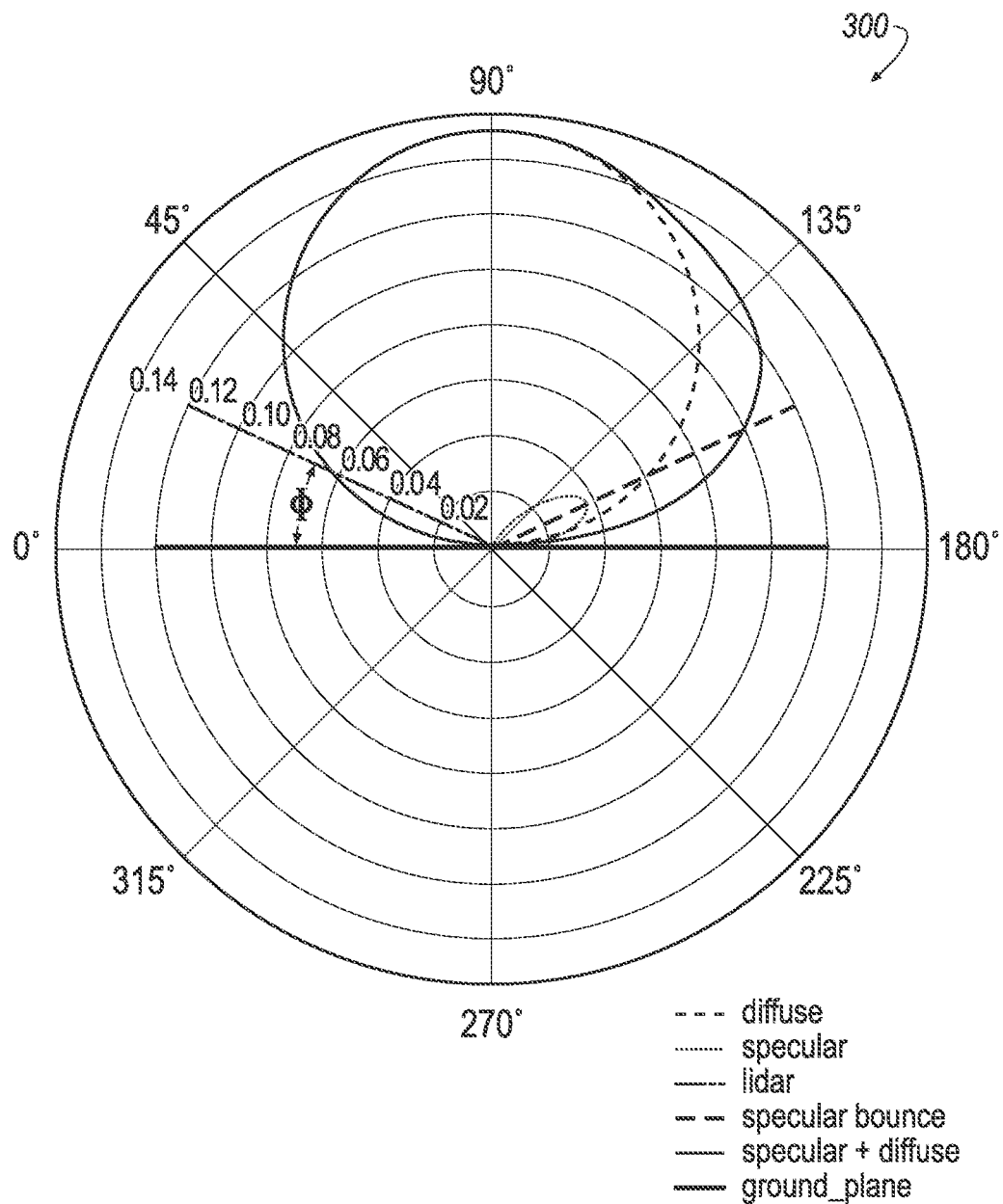
FIG. 3 shows a graph of light reflection pattern with mostly diffuse reflections.

The graph 300 of FIG. 3 shows reflection of the light beam from the ground plane (i.e., representing a surface 150) under a dry-condition. As the diffuse reflection curve shows, a light beam may be diffused symmetrically when hits a dry surface 150. Thus, as shown in the graph 300, the sum of diffuse and specular reflections may have a substantially symmetrical shape, e.g., round. In other words, the light is substantially diffused rather than causing specular reflections.

Figure 4:
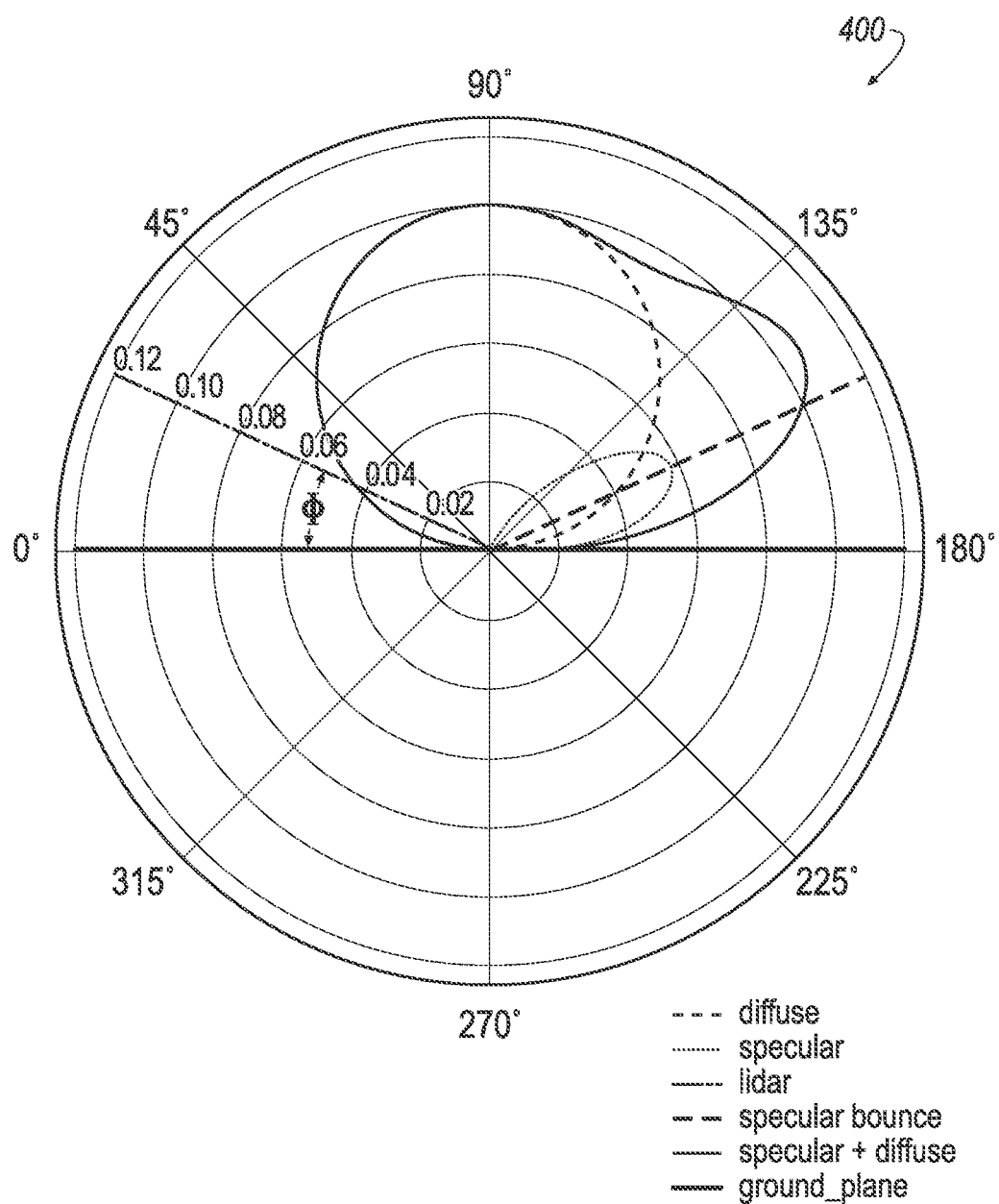
FIG. 4 shows a graph of light reflection pattern with mixed diffuse and specular reflections.
Figure 5:
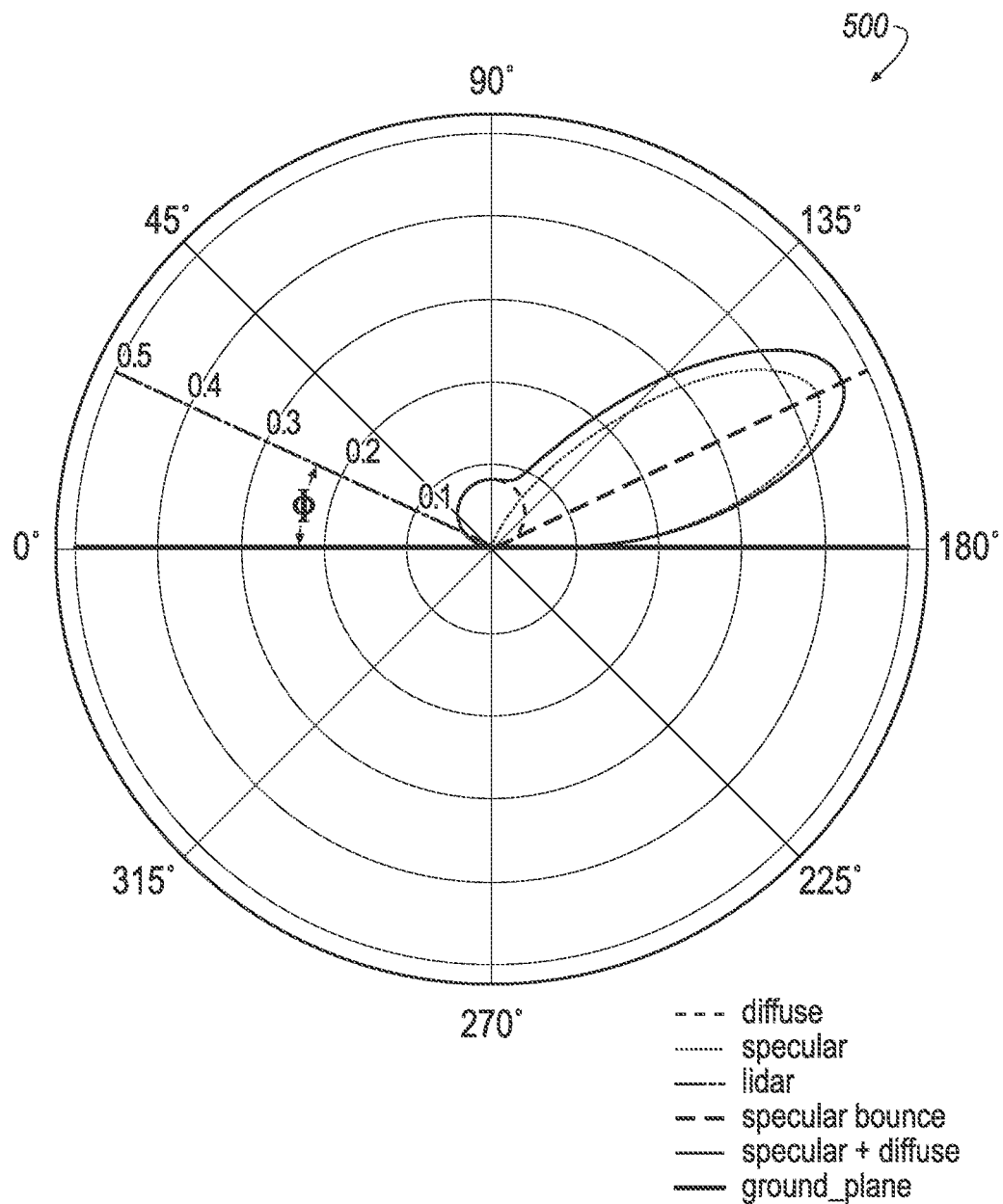
FIG. 5 shows a graph of light reflection pattern with mostly specular reflections.
Figure 6:
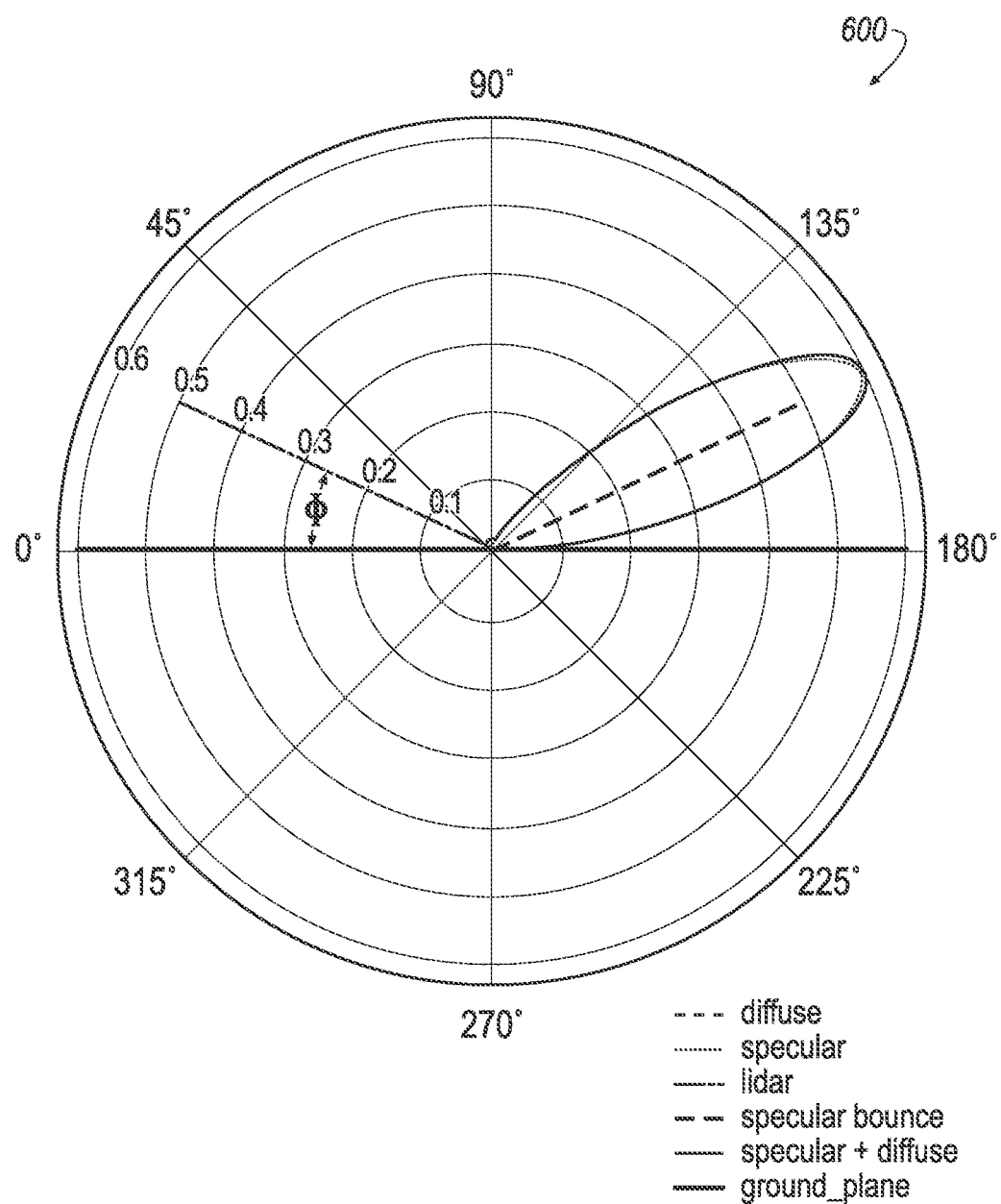
FIG. 6 shows a graph of light reflection pattern of a wet road surface.

The graph 400 of FIG. 4 shows reflections of light from the ground plane when the surface 150 is slightly moist and the graph 500 shows reflection of light from the ground plane when the ground plane (representing the surface 150) is moist. By comparing the graphs 300, 400, and 500, it is evident how an increase in a moisture level (changing from dry to slightly moist, and from slightly moist to moist) causes an increase in specular reflection compared to diffused reflection. The graph 600 of FIG. 6 shows reflections of the light beam from the ground plane when the surface 150 is wet (e.g., standing water). As shown in graph 600, a reflection of light from a wet surface 150 may substantially include specular reflection.

Figure 7:
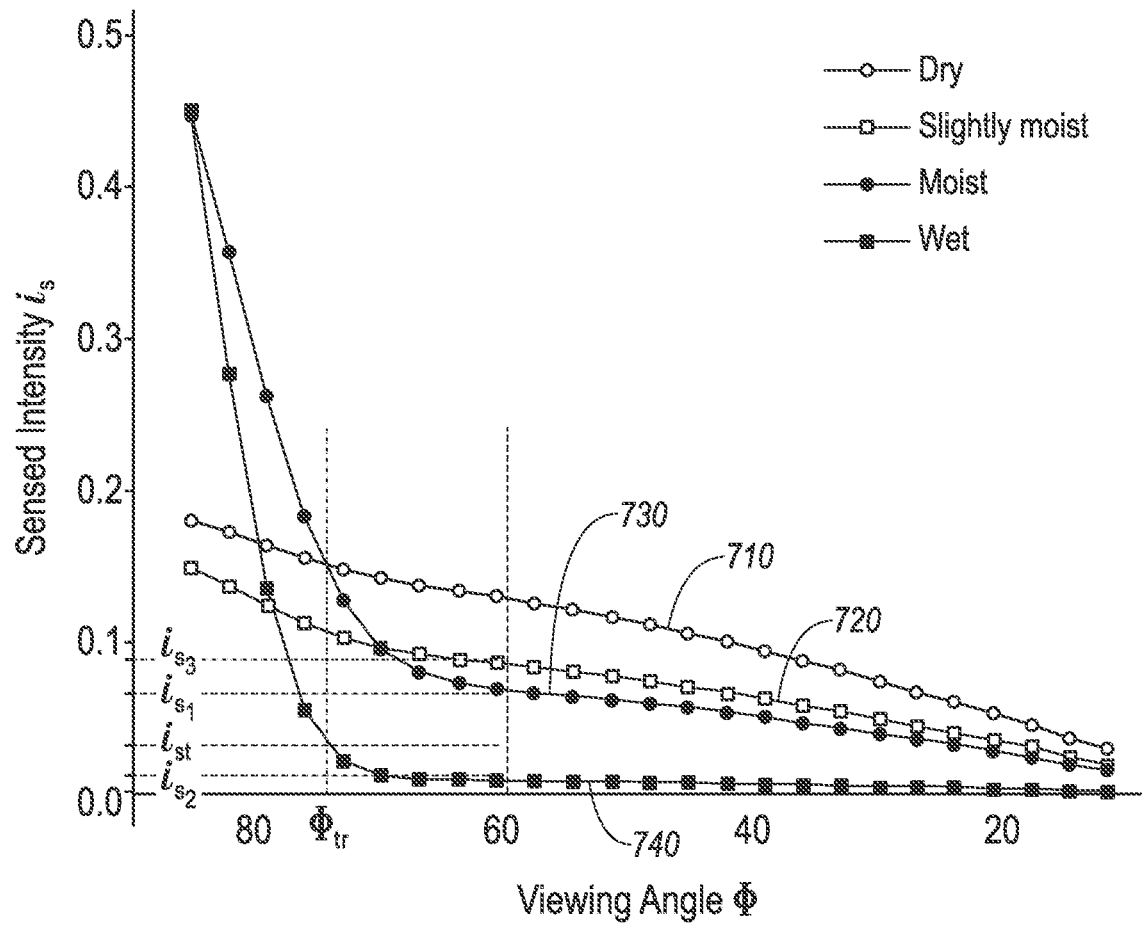
FIG. 7 shows a graph of reflectivity versus viewing angle for the light reflection patterns of FIGS. 3-6.

As discussed above with reference to Equation (1), a sensed intensity $i_s$ at the sensor 130 is at least partially based on a viewing angle Φ. FIG. 7 shows a graph 710-740 of sensed intensity $i_s$ versus the viewing angle Φ. With additional reference to the graph 300, the graph 710 shows changes of the sensed intensity $i_s$ versus the viewing angle Φ on a dry ground plane. With additional reference to the graph 400, the graph 720 shows changes of the sensed intensity $i_s$ versus the viewing angle Φ on a slightly moist ground plane. With additional reference to the graph 500, the graph 730 shows changes of the sensed intensity $i_s$ versus the viewing angle Φ on a moist ground plane. With additional reference to the graph 600, the graph 740 shows changes of the sensed intensity $i_s$ versus the viewing angle Φ on a wet ground plane.

As shown in graphs 710-740, a reflectivity R of the surface 150 changes as a moisture level on a surface 150 changes. For example, with reference to Equations (2)-(3) and FIG. 7, at a viewing angle 60°, the sensor 130 may receive a first sensed intensity $i_{s1}$ from a moist surface 150 based on an adjusted first reflectivity $R_1$ of the moist surface 150, and may receive a second sensed intensity $i_{s2}$ from a wet surface 150 based on an adjusted second reflectivity $R_2$ of the wet surface 150. Equation (2) shows how the first sensed intensity $i_{s1}$ is determined using Equation (1) based on the reflectivity $R_1$ of the moist surface 150, the distance d, and the intensity $i_e$ of the emitted light beam 135 with a viewing angle 60°. Equation (3) shows how the second sensed intensity $i_{s2}$ is determined using Equation (1) based on the reflectivity $R_2$ of the moist surface 150, the distance d, and the intensity $i_e$ of the emitted light beam 135 with a viewing angle 60°.

$$i_{s1}(x,y,z)=f(R_1(x,y,z),60°,i_e(x,y,z),d(x,y,z)) \quad (2)$$

$$i_{s2}(x,y,z)=f(R_2(x,y,z),60°,i_e(x,y,z),d(x,y,z)) \quad (3)$$

With reference to graphs 710-740, note that a reflectivity R of the wet surface 150 may be greater than a dry or slightly moist surface 150, when the viewing angle Φ is greater than an angle threshold $Φ_{tr}$. When the viewing angle Φ exceeds the angle threshold $Φ_{tr}$, then a reflectivity R of the wet or moist surface 150 exceeds a reflectivity R of the surface 150 with a moisture level of dry-condition or slightly moist.

A dry-condition reflectivity threshold $R_t$ may be defined to detect a wet surface 150. With reference to graphs 710-740 and Equation (4) below, at a viewing angle 60°, a sensed intensity $i_s$ less than sensed intensity threshold $i_{s_t}$ may indicate a wetness of the surface 150 at the location coordinates (x, y, z). In one example, with reference to Equation (4), the sensed intensity threshold $i_{s_t}$ may be defined based on the first and second intensities $i_{s1}$, $i_{s2}$. In another example, a sensed intensity threshold $i_{s_t}$ may be defined based on the second sensed intensity $i_{s2}$, e.g., the threshold may be an intensity that is 10% greater than the second sensed intensity $i_{s2}$. In yet another example, the intensity threshold $i_{s_t}$ may be substantially equal to a third sensed intensity $i_{s3}$ that corresponds to a sensed intensity from a lightly moist surface 150. In other words, the reflectivity threshold $R_t$ may be adjusted to define up to what moisture level on the surface 150 may be considered as dry.

With reference to Equation (1) a sensed threshold intensity $i_{s_t}$ can be determined based on light intensity $i_e$ reflected from the surface 150 with the reflectivity threshold $R_t$ at a distance d from the sensor 130. Thus, Equation (5) shows a relationship of the reflectivity threshold $R_t$, the viewing angle Φ, e.g., 60°, the emitted intensity $i_e$, distance d, and sensed intensity threshold $i_{s_t}$. Equation (6) specifies the reflectivity R based on the sensed intensity threshold $i_s$, the viewing angle Φ, the emitted intensity $i_e$, and the distance d. Operation g is a function that determines the reflectivity threshold R based on the inputs: a viewing angle Φ, e.g., 60°, the emitted intensity $i_e$, distance d, and sensed intensity $i_s$. In other words, based on a sensed intensity $i_s$ and determined viewing angle Φ, and the distanced, the reflectivity R of the surface 150 at the location coordinates (x, y, z) can be determined. For example, based on Equation (6), the reflectivity threshold $R_t$ may be determined based on the sensed intensity threshold $i_{s_t}$, the viewing angle Φ, etc. Equation (6) may be derived based on empirical methods, e.g., based on results of iterative experiments with various emitted light intensity $i_e$, viewing angles $\Phi$, sensed intensities $i_s$. Additionally or alternatively, Equation (6) may be determined based on known techniques from optics physics.

$$i_{s_t} = \frac{i_{s_1} + i_{s_2}}{2} \quad (4)$$

$$i_{s_t}(x, y, z) = f(R_t(x, y, z), 60°, i_e(x, y, z), d(x, y, z)) \quad (5)$$

$$R(x, y, z) = g(i_s(x, y, z), \Phi, i_e(x, y, z), d(x, y, z)) \quad (6)$$

In one example, the computer 110 may be programmed to determine whether a surface 150 is wet at, e.g., a point 170 with location coordinates (x, y, z) based on a reflectivity R of the surface 150. The computer 110 may be programmed, based on Equation (6), to determine, based on lidar sensor 130 data, a reflectivity R of a section (or area) of a road surface 150, and to determine whether the identified section is wet based on the determined reflectivity R of the section, a dry-condition reflectivity threshold $R_t$ for the section, and an angle $\Phi$ of viewing the section from the lidar sensor 130. As discussed above, a map-based reflectivity $R_m$ of the surface 150 may be determined based on map data, e.g., included in the point cloud data. With reference to Equation (7), a reflectivity threshold $R_t$ for location coordinates (x, y, z) may be determined based on the reflectivity $R_m$ (determined based on map data or included in the map data), the viewing angle, and the distance d from the vehicle 100 sensor 130 to the location coordinates (x, y, z). Operator h is a function that determines the reflectivity threshold based on reflectivity $R_m$, angle $\Phi$, and distance d.

$$R_t(x,y,z) = h(R_m(x,y,z), \Phi, d(x,y,z)) \quad (7)$$

In the present context, a "section of the road surface" or "area of the road surface" is a continuous surface area that includes one or more points 170 on the surface 150 within the area 160. The section of the surface 150 may be a geometrically-shaped, e.g., circular, rectangular, etc., or non-geometrically shaped section on the surface 150 including a plurality of points 170. For example, a section of the surface 150 may include a 1 meter by 1 meter square-shaped section of the road surface 150. The computer 110 may be programmed to determine that a portion of the surface is wet upon determining that the surface 150 in at least a minimum number, e.g., 5, of points 170 within the identified section is wet.

In order to determine whether the surface 150 at a point 170 is wet, the point 170 needs to be within a field of view of the sensor 130 because the computer 110 determines the reflectivity R at the point 170 based on reflections received from the point 170 on the surface 150. The computer 110 may be programmed to identify a point 170 based on data received from the vehicle 100 sensor 130 only upon determining that the road surface 150 is visible to the lidar sensor 130. For example, the computer 110 may be further programmed to determine that the road surface 150 is visible at a point 170 with location coordinates (x, y, z), based on the lidar map data and a location of a detected object, e.g., a second vehicle, a bicycle, etc., on the road surface 150. The computer 110 may detect an object, based on data received a vehicle 100 object detection sensor 130, e.g., camera, lidar, radar, etc., and identify an area of the surface 150 that is invisible for the lidar sensor 130 based on a location and dimensions of the detected object.

As discussed above, the map data may include a reflectivity R of a point 170 and/or a material from which the surface 150 is formed at the point 170. The computer 110 may be programmed to determine the dry-condition reflectivity threshold $R_t$ based on the lidar map data, to adjust the dry-condition reflectivity threshold $R_t$ based on the viewing angle $\Phi$ of the area, and to determine that the area is wet based on the adjusted dry-condition reflectivity threshold $R_t$.

As seen with reference to the graphs 710, 620, 730, 740, a reflectivity R of the wet surface 150 may be greater than a dry or slightly moist surface 150 when the viewing angle $\Phi$ is greater than an angle threshold $\Phi_{tr}$. In other words, when the viewing angle $\Phi$ exceeds the angle threshold $\Phi_{tr}$, then a reflectivity R of the wet or moist surface 150 exceeds a reflectivity R of the surface 150 with moisture level of dry-condition or slightly moist.

The computer 110 may be programmed to determine the angle threshold $\Phi_{tr}$ for the surface 150, e.g., stored in a computer 110 memory, and determine a sensed intensity threshold $i_{st}$ based on the reflectivity R of the surface 150 at the point 170, the viewing angle $\Phi$, and the distance d. The computer 110 may be then programmed to determine that the surface 150 at the point 170 is wet upon determining one of: (i) the sensed intensity $i_s$ is less than the intensity threshold $i_{st}$ and the viewing angle $\Phi$ is less than the viewing angle threshold $\Phi_{tr}$, or (ii) the sensed intensity $i_s$ is greater than the intensity threshold $i_{st}$ and the viewing angle $\Phi$ is greater than the viewing angle threshold $\Phi_{tr}$.

In one example, e.g., to improve accuracy in determining whether the surface 150 is wet, the computer 110 may be programmed to determine the sensed intensity $i_s$ of a point 170 from different viewing angles $\Phi$. For example, with reference to FIG. 1, the computer 110 may be programmed to determine a first sensed intensity $i_s$ with a first viewing angle $\Phi$ at the point 170, and then upon further movement of the vehicle 100 toward the point 170, determine a second sensed intensity $i_s$ with a second viewing angle $\Phi$. In one example, the computer 110 may be programmed to determine that the point 170 is wet upon determining based on each of the measurements of sensed intensity $i_s$ with the first and second viewing angles $\Phi$ that the surface 150 at the point 170 is wet. For example, as the vehicle 100 moves on a road, the computer 110 may determine multiple times whether a point 170 on the road surface 150 is wet as the vehicle 100 approaches the point 170 on the road surface 150. In one example, the computer 110 may determine the surface 150 at the point 170 is wet upon determining that at least a percentage, e.g., 70%, of determinations concluded that the surface 150 at the point 170 is wet.

In one example, the computer 110 may determine the first sensed intensity $i_s$ from the first viewing angle $\Phi$ based on data received from a first sensor 130, e.g., a lidar sensor 130 on a vehicle 100 roof, and the second sensed intensity $i_s$ based on data received from a second vehicle 100 lidar sensor 130 mounted to a vehicle 100 bumper.

In one example, the computer 110 may be programmed to determine a viewing angle threshold $\Phi_{tr}$ for the identified area, e.g., a point 170, and to determine that the surface 150 at the point 170 is wet upon determining that (i) when viewed from a first viewing angle $\Phi_1$ less than the viewing angle threshold $\Phi_{tr}$, the sensed intensity $i_s$ is less than a first intensity threshold $i_{st}$ for the first viewing angle $\Phi_1$, and (ii) when viewed from a second viewing angle $\Phi_2$ greater than the viewing angle threshold $\Phi_{tr}$, a sensed intensity $i_s$ is greater than a second intensity threshold $i_{st}$ for the second viewing angle $\Phi_2$.

Figure 8:
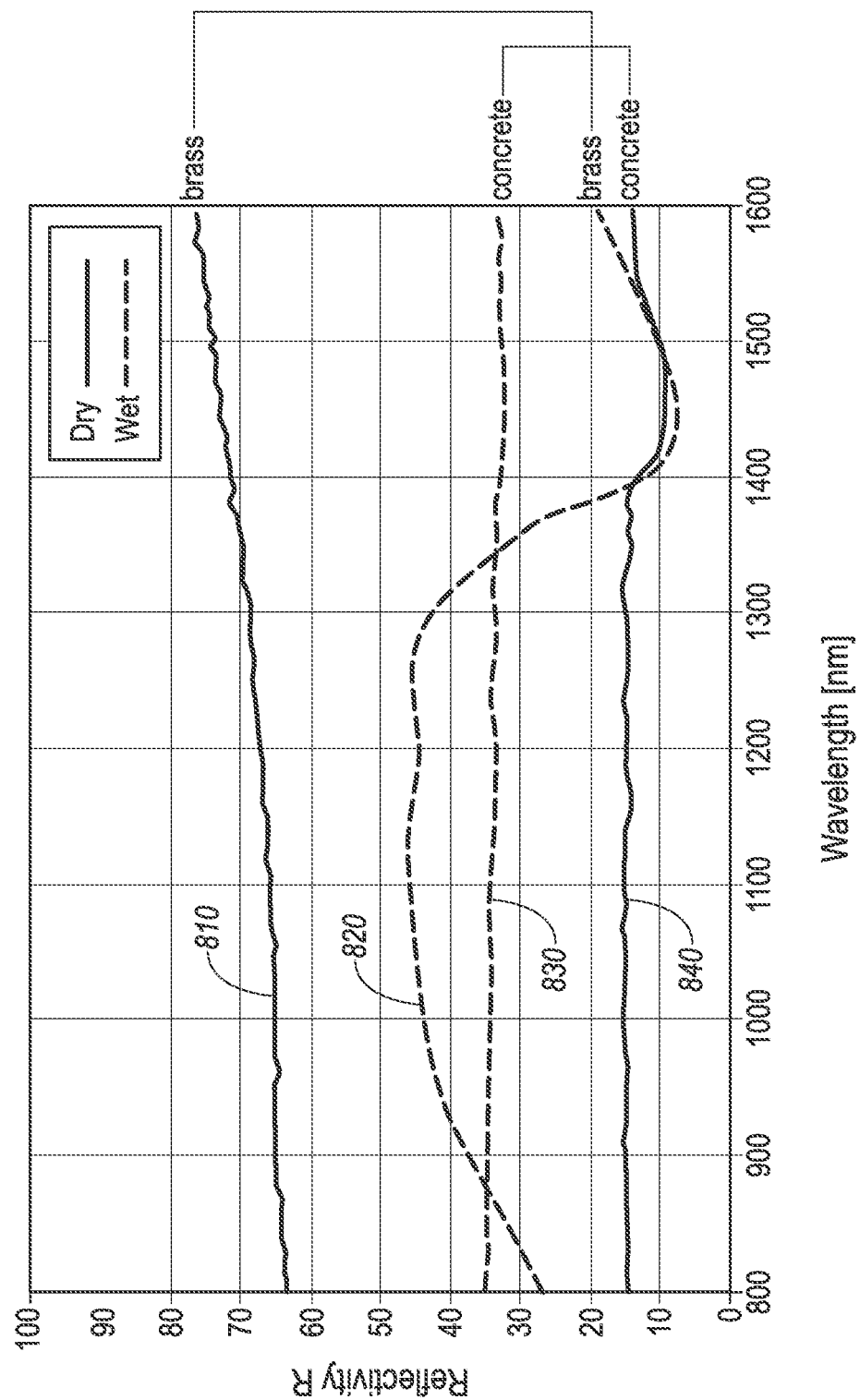
FIG. 8 shows graphs of changing reflectivity of various materials based on wavelength.

FIG. 8 shows example graphs 810, 820, 830, 840 which illustrate the change of reflectivity R of different materials, e.g., concrete and brass, based on the wavelength of light that hits a surface 150 formed of a respective material and based on being wet or dry. The computer 110 may be programmed to identify a wet surface 150 based on a known material of the surface 150, e.g., determined based on map data, and determining the material based on data received from the lidar sensor 130. The computer 110 may store data including a reflectivity R of different materials such as data illustrated in graphs 810 and 840. Thus, the computer 110 may determine a reflectivity R of the surface 150, e.g., based on Equation (6), and then classify the material based on the determined reflectivity R.

In one example, the computer 110 may determine a first material of the surface 150, e.g., concrete, based on image data received from a vehicle 100 camera sensor 130. Thus, the computer 110 may identify a material of surface 150 using image processing techniques. In another example, the computer 110 may be programmed to identify a second material of the surface 150 based on the received map data (e.g., map data may include a material identifier for each point 170). The computer 110 may be programmed to classify a second material at the surface 150 based on the reflectivity R of the surface 150 determined based on the viewing angle Φ, distance d, emitted intensity $i_e$, and sensed intensity $i_s$. The computer 110 may determine that the surface 150 at point 170 is wet upon determining that the surface 150 material is misclassified (i.e., the determined first and second materials are different). For example, with reference to graphs 810-840, the computer 110 may misclassify a wet concrete surface 150 as brass. Note that the reflectivity of wet concrete (graph 820) being substantially same as the reflectivity R of dry brass (graph 840) in a wavelength range such as 1400 to 1600 nanometer (nm).

As discussed above, a determination of whether a surface 150 is wet is partially based on received map data. However, a road surface 150 may have recently changed (i.e., after generating the received map data), e.g., as a result of resurfacing the road surface 150, painting new road marking on the road surface 150, etc. The computer 110 may be programmed to determine an inconclusive wetness detection upon determining based on vehicle 100 camera sensor 130 data that lidar map data lacks data including a change made to the road surface 150.

Figure 9:
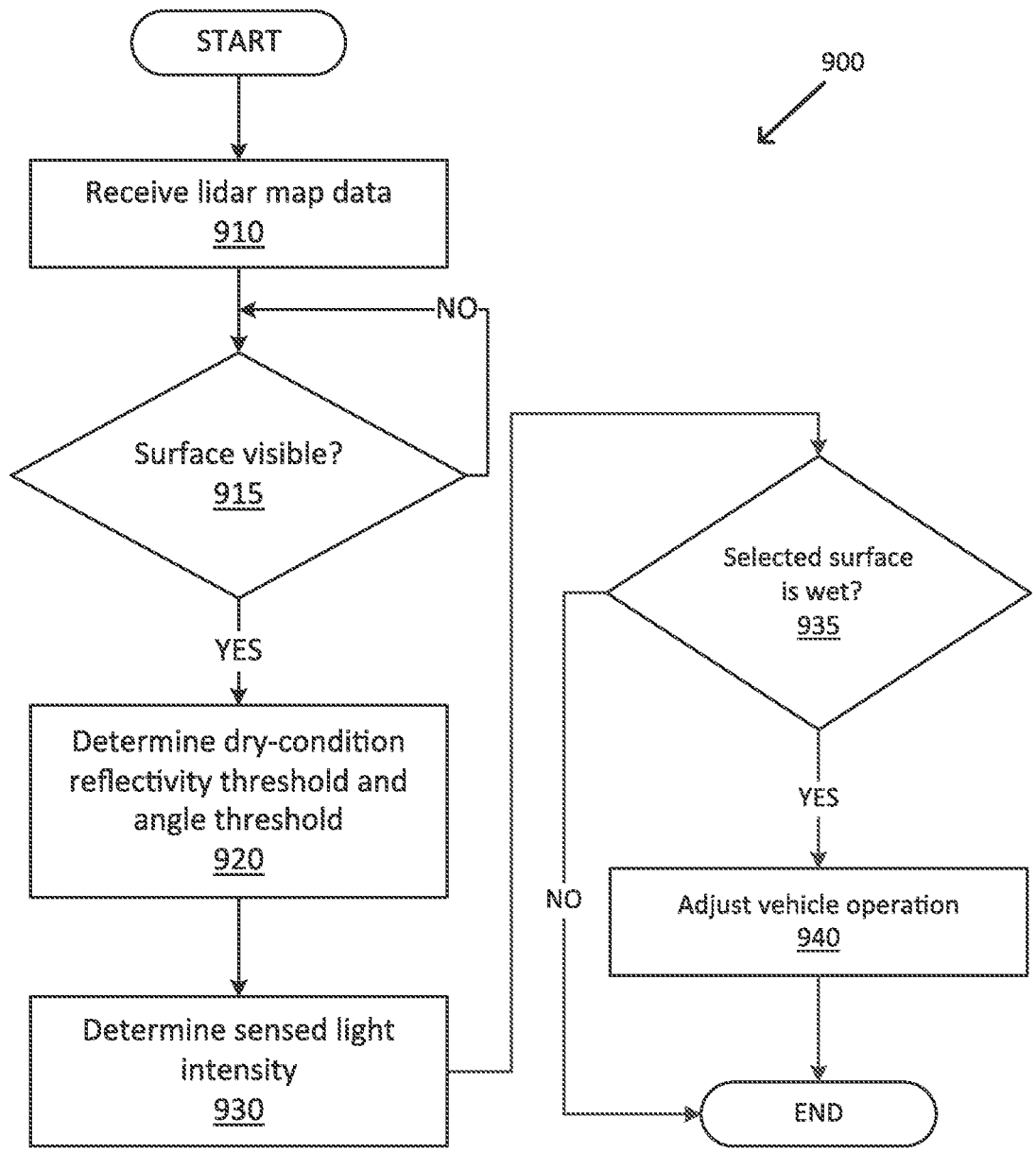
FIG. 9 illustrates a flowchart of an exemplary process for detecting a wet surface.

FIG. 9 is a flowchart illustrating an exemplary process 900 for detecting a wet surface 150. The computer 110 may be programmed to execute blocks of the process 900.

With reference to FIG. 9, the process 900 begins in a block 910, in which the computer 110 receives a lidar map (or point cloud data) for an area 160. The received map data may include a reflectivity R and/or an intensity of light received from each point 170 on a surface 150 within the area 160.

Next, in a decision block 915, the computer 110 identifies a visible surface 150 for determining whether the surface 150 is wet. For example, the computer 110 may be programmed to detect objects such as other vehicles, bicycles, trucks, etc., and to identify surfaces 150 that are not visible because the respective object blocks a view of the sensor 130. For example, the computer 110 may identify a point 170 on the road surface 150 that is visible to the sensor lidar 130. If the computer 110 identifies a visible point 170 on a surface 150 within the field of view of the sensor 130, then the process 900 proceeds to a block 920; otherwise the process 900 returns to the decision block 915.

In the block 920, the computer 110 determines a dry-condition reflectivity threshold $R_t$ and the viewing angle threshold $\Phi_{tr}$ for the surface 150 at the point 170 coordinates (x, y, z). The computer 110 may be programmed, based on Equation (7), to determine the dry-condition reflectivity threshold $R_t$ based on the viewing angle Φ, the distance d to the location coordinates (x, y, z), and the map-based reflectivity $R_m$, of the location coordinates (x, y, z). The computer 110 may be programmed to determine the viewing angle threshold $\Phi_{tr}$ based on data stored in the computer 110 memory. For example, the map data may include the viewing angle threshold $\Phi_{tr}$.

Next, in a block 930, the computer 110 determines a sensed intensity $i_s$ of reflections received from the location coordinates (x, y, z) based on data received from the vehicle 100 sensor 130.

Next, in a decision block 935, the computer 110 determines whether the surface 150 at the location coordinates (x, y, z) is wet. The computer 110 may be programmed to determine whether the surface 150 is wet based on the sensed intensity $i_s$, the reflectivity threshold $R_t$, and the viewing angle threshold $\Phi_{tr}$, as discussed above. Additionally or alternatively, as discussed above, the computer 110 may be programmed to determine a sensed intensity $i_s$ from multiple viewing angles Φ. If the computer 110 determines that the surface 150 is wet, the process 900 proceeds to a block 940; otherwise the process 900 ends, or alternatively returns to the block 910.

In the block 940, the computer 110 adjusts vehicle 100 operation based on determined wet surface 150. In one example, the vehicle 100 computer 110 may be programmed, upon determining that the wet surface 150 is within a vehicle 100 route, to reduce a vehicle 100 speed. For example, the computer 110 may be programmed to actuate a vehicle 100 actuator 120 to reduce a vehicle 100 speed. In one example, the computer 110 may be programmed to reduce the vehicle 100 speed to below speed threshold based on a moisture level of the road surface 150 within the vehicle 100 route. The computer 110 may be programmed to limit the vehicle 100 speed to 80 kilometer per hour (kph), upon determining that the road surface 150 within the vehicle 100 route is wet. The computer 110 may be programmed to limit the vehicle 100 speed to 100 kph, upon determining that the road surface 150 is moist. The computer 110 may be programmed to limit the vehicle 100 speed by actuating the vehicle 100 actuators 120 such as brake and propulsion actuators 120.

Additionally or alternatively, the computer 110 may be programmed, based on detected moisture level of the road surface 150, to adjust vehicle 100 operation with respect to an expected braking distance (i.e., adjusting the vehicle following distance). Thus, the computer 110 may increase an expected braking distance and adjust a distance of the vehicle 100 to other objects, e.g., a second vehicle in front of the vehicle 100, based on the adjusted braking distance. In one example, the computer 110 may be programmed to increase the expected brake distance by a factor determined based on moisture level, e.g., a factor of 2 for wet surface 150, a factor of 1.5 for mist surface 150, etc. In one example, the computer 110 may be programmed to predict a trajectory of movement of a second vehicle ahead or behind of the vehicle 100 in case of a braking actuation based on the detected moisture level on the road surface 150. The computer 110 may be programmed to adjust vehicle 100 operation, e.g., adjusting a minimum distance, clearance, extended time to collision, etc., based on the predicted trajectory of the second vehicle.

Following the block 940, the process 900 ends, or alternatively returns to the block 910.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer comprising a processor and a memory, the memory storing instructions such that the processor is programmed to:
   determine, based on vehicle lidar sensor data, a reflectivity of an area of a road surface;
   determine a dry-condition reflectivity of the area based on stored lidar map data;
   determine a dry-condition reflectivity threshold based at least in part on (i) a viewing angle of the area, and (ii) the determined dry-condition reflectivity; and
   determine whether the area is wet based on the determined reflectivity of the area and the dry-condition reflectivity threshold for the area.

2. The system of claim 1, wherein the instructions include further instructions to identify the area based on data received from at least one of a vehicle camera and the vehicle lidar sensor only upon determining that the road surface is visible to the lidar sensor.

3. The system of the claim 1, wherein the instructions include further instructions to determine that the road surface is visible at the area based on lidar map data and a location of a detected object on the road surface.

4. The system of claim 1, wherein the instructions include further instructions to:
   determine a second reflectivity of the area from a second viewing angle, and
   determine that the area is wet further based on the second reflectivity and the second viewing angle.

5. The system of claim 4, wherein the instructions include further instructions to:
   determine a viewing angle threshold for the area; and
   determine that the area is wet upon determining that
   (i) the viewing angle threshold is less than the second viewing angle and greater than the viewing angle;
   (ii) the reflectivity is less than the dry-condition reflectivity threshold adjusted for the viewing angle; and
   (iii) the second reflectivity is greater than the dry-condition reflectivity threshold adjusted for the second viewing angle.

6. The system of claim 4, wherein the instructions include further instructions to determine the reflectivity with the viewing angle based on data received from the lidar sensor and the second reflectivity with the second viewing angle based on data received from a second lidar sensor.

7. The system of claim 1, wherein the instructions include further instructions to:
   classify the area with a first material based on at least one of map data and camera data;
   classify the area with a second material based at least in part on the determined reflectivity; and
   determine that the area is wet upon determining, based on the first and second materials, that the area is misclassified.

8. The system of claim 1, wherein the instructions include further instructions to determine an inconclusive wetness detection upon determining based on vehicle camera data that lidar map data lacks data including a change made to the road surface, wherein the change is at least one of resurfacing the road surface and painting a new road marking.

9. A system, comprising:
   means for determining, based on lidar sensor data, a reflectivity of an area of a road surface;
   means for determining a dry-condition reflectivity of the area based on stored lidar map data;

means for determining a dry-condition reflectivity threshold based at least in part on (i) a viewing angle of the area, and (ii) the determined dry-condition reflectivity; and means for determining whether the identified area is wet based on the determined reflectivity of the area and the dry-condition reflectivity threshold for the area.

10. A method, comprising:

determining, based on lidar sensor data, a reflectivity of an area of a road surface;

determining a dry-condition reflectivity of the area based on stored lidar map data;

determining a dry-condition reflectivity threshold based at least in part on (i) a viewing angle of the area, and (ii) the determined dry-condition reflectivity; and determining whether the identified area is wet based on the determined reflectivity of the area and the dry-condition reflectivity threshold for the area.

11. The method of claim 10, further comprising identifying the area based on data received from at least one of a vehicle camera and the vehicle lidar sensor only upon determining that the road surface is visible to the lidar sensor.

12. The method of claim 10, further comprising determining that the road surface is visible at the area based on lidar map data and a location of a detected object on the road surface.

13. The method of claim 10, further comprising:

determining a second reflectivity of the area from a second viewing angle, and determining that the area is wet further based on the second reflectivity and the second viewing angle.

14. The method of claim 13, further comprising:

determining a viewing angle threshold for the area; and determining that the area is wet upon determining that (iv) the viewing angle threshold is less than the second viewing angle and greater than the viewing angle;

(v) the reflectivity is less than the dry-condition reflectivity threshold adjusted for the viewing angle; and (vi) the second reflectivity is greater than the dry-condition reflectivity threshold adjusted for the second viewing angle.

15. The method of claim 13, further comprising determining the reflectivity with the viewing angle based on data received from the lidar sensor and the second reflectivity with the second viewing angle based on data received from a second lidar sensor.

16. The method of claim 10, further comprising:

classifying the area with a first material based on at least one of map data and camera data;

classifying the area with a second material based at least in part on the determined reflectivity; and determining that the area is wet upon determining, based on the first and second materials, that the area is misclassified.

17. The method of claim 10, further comprising determining an inconclusive wetness detection upon determining based on vehicle camera data that lidar map data lacks data including a change made to the road surface, wherein the change is at least one of resurfacing the road surface and painting a new road marking.

* * * * *